United States Patent [19]

Shiokawa

[11] Patent Number: 5,576,983

[45] Date of Patent: Nov. 19, 1996

[54] ARITHMETIC CIRCUIT FOR ADAPTIVE EQUALIZER OF LMS ALGORITHM OF REDUCED AMOUNT OF OPERATION

[75] Inventor: Toshimichi Shiokawa, Tokyo, Japan

[73] Assignee: NEC Corporation, Tokyo, Japan

[21] Appl. No.: 361,283

[22] Filed: Dec. 22, 1994

[30] Foreign Application Priority Data

Dec. 27, 1993 [JP] Japan .................... 5-333638

[51] Int. Cl.$^6$ .................................... G06F 7/52
[52] U.S. Cl. .................................... 364/754
[58] Field of Search .................... 364/736, 754, 364/724.2

[56] References Cited

U.S. PATENT DOCUMENTS

| | | | |
|---|---|---|---|
| 3,926,367 | 12/1975 | Bond et al. | 364/754 |
| 4,344,151 | 8/1982 | White | 364/754 |
| 4,680,727 | 7/1987 | White | 364/754 |

*Primary Examiner*—David H. Malzahn
*Attorney, Agent, or Firm*—Whitham, Curtis, Whitham & McGinn

[57] ABSTRACT

An arithmetic circuit for adaptive equalizer of Least Mean Square (LMS) algorithm. Includes a real operation part computing a first product between a real part signal of a data sequence and a product of a real part signal of an error sequence and a step coefficient, and computing a second product between an imaginary part signal of the data sequence and a product of an imaginary part signal of the error sequence and a step coefficient. Either of the first and second products is negative. The real operation part further computes a real part of an adaptation coefficient from the first and second products. An imaginary operation part computes a third product between the imaginary part signal of the data sequence and a product of the real part signal of the error sequence and the step coefficient, and computes a fourth product between the real part signal of the data sequence and a product of the imaginary part signal of the error sequence and the step coefficient, so as to obtain an imaginary part of an adaptation coefficient from the third and fourth products.

6 Claims, 5 Drawing Sheets

ARITHMETIC CIRCUIT FOR ADAPTIVE EQUALIZER OF LMS ALGORITHM OF REDUCED AMOUNT OF OPERATION

BACKGROUND OF THE INVENTION

1. Field of the Invention

The present invention relates to an arithmetic circuit for adaptive equalizer of LMS (Least Mean Square) algorithm, and more specifically to an arithmetic circuit for adaptive equalizer of LMS algorithm, which reduces an amount of operations.

2. Description of Related Art

In data transmission systems, equalizers are used so as to remove intersymbol interferences thereof. Adaptive equalizers can eliminate intersymbol interferences in accordance with fluctuations of properties of data transmission systems in time.

An adaptive equalizer of LMS algorithm renews an adaptation coefficient according to following equations:

$$C^i_{n+1} = C^i_n - \alpha D^i_n E^i_n \quad (1)$$

$C^i_{n+1}$: filter coefficient sequence at a sample time of n + 1

$C^i_n$: filter coefficient sequence at a sample time of n $\alpha$: step coefficient $D^i_n$: data sequence at a sample time of n $E^i_n$: error sequence at a sample time of n By expanding $\alpha D^i_n E^i_n$ of the equation (1) into a real part and an imaginary part, the following equations are obtained:

$$D^i_n = a+jb \quad (2)$$

$$E^i_n = c-jd \quad (3)$$

$$\alpha D^i_n E^i_n = \alpha(a+jb)(c-jd) = \alpha(ac+bd)+j\alpha(bc-ad) \quad (4)$$

The filter coefficient sequence at a sample time of n+1 is a difference between the filter coefficient sequence at a sample time of n and $\alpha D^i_n E^i_n$ so that renewal of the adaptation coefficient is determined by the adaptation coefficient $\alpha D^i_n E^i_n$.

Referring to FIG. 1, a conventional arithmetic circuit for adaptive equalizer will be explained. There is shown a block diagram of a conventional arithmetic circuit for adaptive equalizer in FIG. 1. The arithmetic circuit comprises a multiplier 1 computing a product of a real part signal 103 (c of the above mentioned equations) of the error sequence $E^i_n$ (c–jd of the above mentioned equations) and the step coefficient 105 ($\alpha$ of the above mentioned equations), and a multiplier 2 computing a product of an imaginary part signal 104 (d of the above mentioned equations) of the error sequence $E^i_n$ (c–jd) and the step coefficient 105 ($\alpha$). The arithmetic circuit also comprises a multiplier 4 computing a product of a real part signal 101 ($\alpha$ of the above mentioned equations) of the data sequence $D^i_n$ (a+jb of the above mentioned equations) and a real part signal 106 ($\alpha$ of the above mentioned equations) of the real part signal 103 (c) of the error sequence $E_n$ (c–jd) and the step coefficient 105 ($\alpha$). The arithmetic circuit further comprises a multiplier 5 computing a product of an imaginary part signal 102 (b of the above mentioned equations) of the data sequence $D^i_n$ (a+jb) and an imaginary signal 107 ($\alpha$d of the above mentioned equations). In addition, the arithmetic circuit comprises a multiplier 6 computing a product of the imaginary part signal 102 (b) and the real part signal 106 ($\alpha$c) and a multiplier 7 computing a product of the real part signal 101 (a) of the data sequence $D^i_n$ (a+jb) and the imaginary signal 107 ($\alpha$d).

The multipliers 4, 5, 6 and 7 respectively send a real signal 108 ($\alpha$ac) of the above mentioned equations), real signal 114 ($\alpha$bd) of the above mentioned equations), imag signal 110 ($\alpha$bc of the above mentioned equations) and imag signal 111 ($\alpha$ad of the above mentioned equations) to rounding processors 10, 11, 12 and 13. The rounding processors 10, 11, 12 and 13 round the real signals 108 ($\alpha$ac) and 114 ($\alpha$bd), and imag signals 110 ($\alpha$bc) and 111 ($\alpha$ad) so as to send rounded signals 115 and 116 to an adder 14 and rounded signals 117 and 118 to a subtracter 9. The adder 14 adds the rounded signals 115 and 116 so as to obtain a real part 112 of an adaptation coefficient. The subtracter 9 subtracts the rounded signal 118 from the rounded signal 117 so as to obtain an imaginary part 113 of an adaptation coefficient.

When the filter of the adaptive equalizer is implemented by a fixed-point DSP (Digital Signal Processor), the product is always truncated regardless of positive or negative due to fixed-point arithmetic. By this, negative errors are produced in the multipliers 4 to 7. If the arithmetic is carried out with the above errors, the errors are accumulated to the filter coefficient so that a theoretical result cannot be obtained. In order to prevent this problem, the outputs of the multipliers of the arithmetic circuit shown in FIG. 1 are rounded so as to reduce multiplication errors produced in the multipliers.

However, operations for the rounding process are one third of the whole operations of the arithmetic circuit so that high speed operations are difficult.

SUMMARY OF THE INVENTION

Accordingly, it is an object of the present invention to provide an arithmetic circuit for adaptive equalizer of LMS algorithm which does not need the rounding operations and has overcome the above mentioned defect of the conventional one.

The above and other objects of the present invention are achieved in accordance with the present invention by an arithmetic circuit for adaptive equalizer of LMS algorithm comprising;

- a real operation part computing a first product between a real part signal of a data sequence and a product of a real part signal of an error sequence and a step coefficient, and computing a second product between an imaginary part signal of the data sequence and product of an imaginary part signal of the error sequence and a step coefficient, wherein either of the first and second products is negative, so as to obtain a real part of an adaptation coefficient from the first and second products; and
- an imaginary operation part computing a third product between the imaginary part signal of the data sequence and product of the real part signal of the error sequence and the step coefficient, and computing a fourth product between the real part signal of the data sequence and product of the imaginary part signal of the error sequence and the step coefficient, so as to obtain an imaginary part of an adaptation coefficient from the third and fourth products.

In the above arithmetic circuit, it is preferable that the real operation part comprises a first multiplier computing a first product between the real part signal of the data sequence and the product of the real part signal of the error sequence and a positive step coefficient, a second multiplier computing a second product between the imaginary part signal of the data sequence and the product of the imaginary part signal of the error sequence and a negative step coefficient, and a first subtracter subtracting the second product from the first product so as to obtain the real part of the adaptation coefficient; and The imaginary operation part comprising a third multiplier computing a third product between the imaginary part signal of the data sequence and product of the real part signal of the error sequence and the positive step coefficient, a fourth multiplier computing fourth product between the real part signal of the data sequence and product of the imaginary part signal of the error sequence and the positive step coefficient, and a second subtracter subtracting the third product from output of the fourth product so as to obtain the imaginary part of the adaptation coefficient from the third and fourth products.

Of course, the real operation part can comprise a first multiplier computing a first product between an inverted real part signal of the data sequence and the product of the real part signal of the error sequence and a positive step coefficient, a second multiplier computing a second product between the imaginary part signal of the data sequence and the product of the imaginary part signal of the error sequence and the positive step coefficient, and a first subtracter subtracting the first product from the second product so as to obtain the real part of the adaptation coefficient.

It is also possible that the real operation part comprises a first multiplier computing the first product between the real part signal of the data sequence and the product of the real part signal of the error sequence and a negative step coefficient, a second multiplier computing the second product between the imaginary part signal of the data sequence and the product of the imaginary part signal of the error sequence and the positive step coefficient, and a first subtracter subtracting the first product from the second product so as to obtain the real part of the adaptation coefficient.

In addition, the real operation part can comprise a first multiplier computing the first product between the real part signal of the data sequence and the product of the real part signal of the error sequence and a positive step coefficient, a second multiplier computing the second product between an inverted imaginary part signal of the data sequence and the product of the imaginary part signal of the error sequence and the positive step coefficient, and a first subtracter subtracting the second product from the first product so as to obtain the real part of the adaptation coefficient.

The above and other objects, features and advantages of the present invention will be apparent from the following description of preferred embodiments of the invention with reference to the accompanying drawings.

DESCRIPTION OF THE PREFERRED EMBODIMENTS

Figure 1:
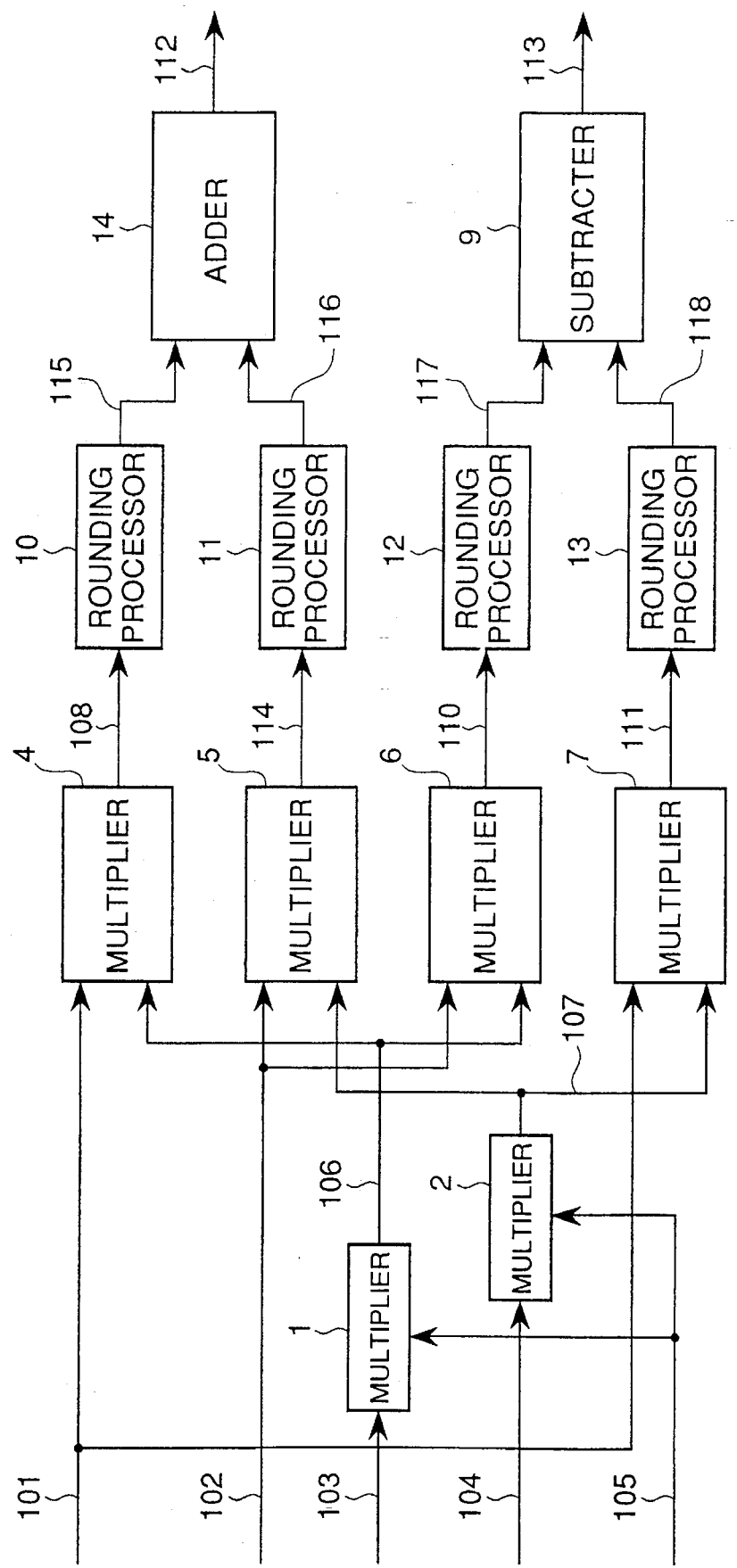
FIG. 1 is a block diagram of a conventional arithmetic circuit for an adaptive equalizer.
Figure 2:
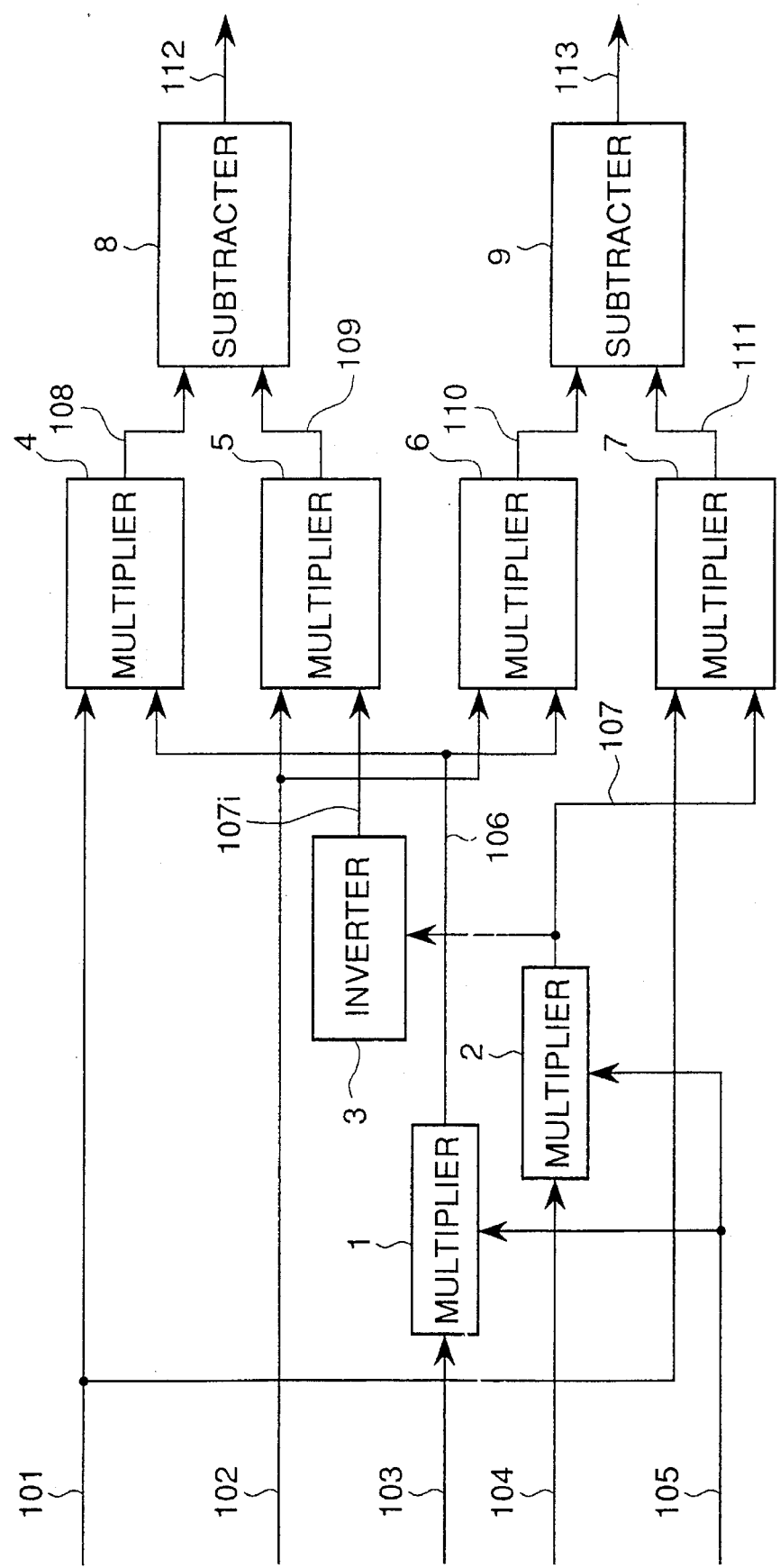
FIG. 2 is a block diagram of an embodiment of the arithmetic circuit for an adaptive equalizer in accordance with the present invention.

Referring to FIG. 2, there is shown a diagram of an arithmetic circuit for an adaptive equalizer in accordance with the present invention. In FIG. 2, corresponding items have the same reference numbers as those of FIG. 1. The arithmetic circuit comprises multipliers 1, 2, 4 to 7. The multiplier 1 computes a product of a real part signal 103 (c) and the step coefficient 105 ($\alpha$) so as to form a real part signal 106 ($\alpha$c). The multiplier 2 computes a product of an imaginary part signal 104 (d) and the step coefficient 105 ($\alpha$) so as to form an imaginary part signal 107 ($\alpha$d). The arithmetic also circuit comprises an inverter 3 which inverts an imaginary signal 107 ($\alpha$d) sent by the multiplier 2 so as to form an inverted imaginary signal 107$i$ ($-\alpha$d).

The multiplier 4 computes a product of a real part signal 101 (a) of the data sequence and the real part signal 106 ($\alpha$c) sent by the multiplier 1 so as to send a real signal 108 ($\alpha$ac) to a subtracter 8. The multiplier 5 computes a product of an imaginary part signal 102 (b) of the data sequence and the inverted imaginary part signal 107$i$ ($-\alpha$d) sent by the inverter 3 so as to send a real signal 109 ($-\alpha$bd) to the subtracter 8. The multiplier 6 computes a product of an imaginary part signal 102 (b) of the data sequence and the real part signal 106 ($\alpha$c) so as to send a imag signal 110 ($\alpha$bc) to a subtracter 9. The multiplier 4 computes a product of a real part signal 101 (a) of the data sequence and the imaginary part signal 107 ($\alpha$d) so as to send a imag signal 111 ($\alpha$ad) to the subtracter 9.

The subtracter 8 subtracts the real signal 109 ($-\alpha$bd) from the real signal 108 ($\alpha$ac) so as to send a real part 112 ($\alpha$ac + $\alpha$bd) of an adaptation coefficient. The subtracter 9 subtracts the imag signal ($\alpha$bc) from the imag signal ($\alpha$ad) so as to send an imaginary part 113 ($\alpha$ad $-$ $\alpha$bc) of an adaptation coefficient.

In the above arithmetic circuit, the real signal 109 ($-\alpha$bd) sent by the multiplier 5 is obtained as an inverted signal of the real signal 114 ($\alpha$bd) sent by the multiplier 5 of the conventional circuit shown in FIG. 1. The real signal 109 ($-\alpha$bd) is also truncated so that negative errors are produced and accumulated in the multiplier 5.

However, the subtracter 8 subtracts the real signal 109 ($-\alpha$bd) from the real signal 108 ($\alpha$ac) so as to obtain the real part 112 ($\alpha$ac + $\alpha$bd) of the adaptation coefficient. In this case, the multiplication errors produced in the multipliers 4 and 5 are subtracted from each other so as to be reduced. Therefore, the negative errors are not accumulated to the filter coefficient so that a theoretical result can be obtained. In the imaginary part, the subtracter 9 subtracts the imag signal 111 ($\alpha$bc) from the imag signal ($\alpha$ad) so as to send the imaginary part 113 ($\alpha$ad $-$ $\alpha$bc) of the adaptation coefficient. Therefore, the multiplication errors produced in the multipliers 6 and 7 are subtracted from each other so that the negative errors are not accumulated to the filter coefficient so that a theoretical result can be obtained like the real part without any rounding processor.

Figure 3A:
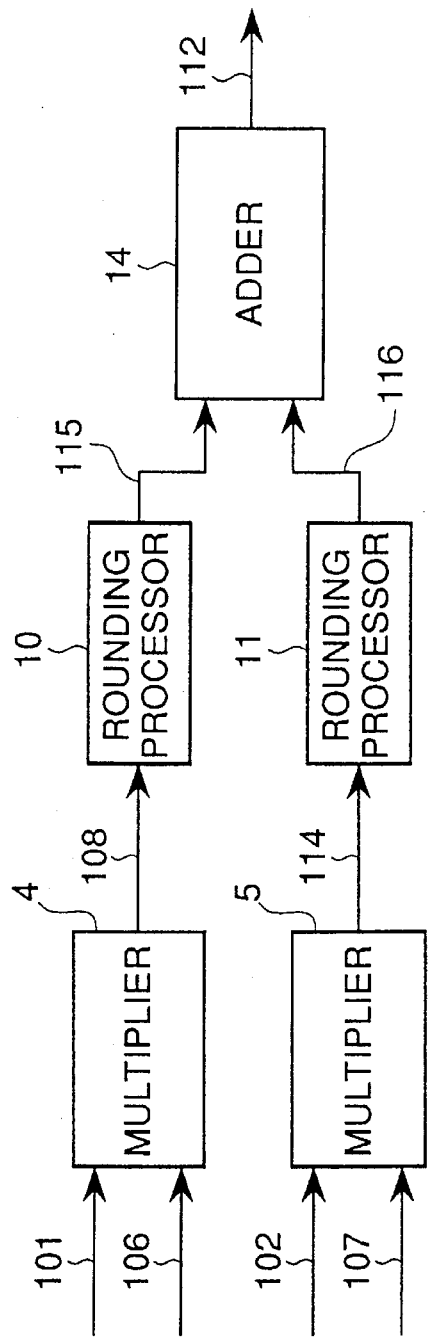
FIGS. 3A and 3B are partial block diagrams of the conventional arithmetic circuit and the arithmetic circuit in accordance with the present invention in which differences between them are shown.
Figure 3B:
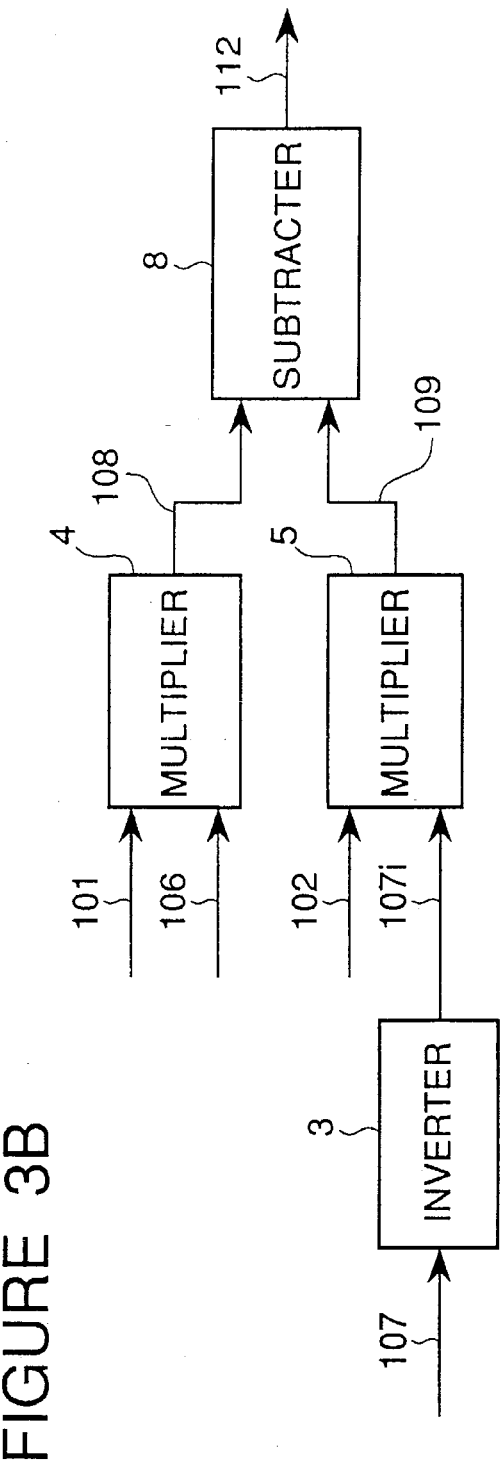

FIGS. 3A and 3B show partial block diagrams of the conventional arithmetic circuit shown in FIG. 1 and the arithmetic circuit in accordance with the present invention shown in FIG. 2 in which differences between them are shown. The conventional arithmetic circuit shown in FIG. 3A comprises a multiplier 4 computing the product of a real part signal 101 (a) of the data sequence and a real part signal 106 ($\alpha$c) so as to send a real signal 108 ($\alpha$ac) to a rounding processor 10. The conventional arithmetic circuit also comprises a multiplier 5 computing the product of an imaginary part signal 102 (b) of the data sequence and an imaginary part signal 107 (αd) so as to send a real signal 114 (αbd) to a rounding processor 11. Rounded signals 115 and 116 are sent from the rounding processors 10 and 11 to an adder 14 so as to obtain a real part 112 (αac + αbd) of an adaptation coefficient.

On the other hand, the arithmetic circuit in accordance with the present invention shown in FIG. 3B comprises a multiplier 4 computing the product of a real part signal 101 (a) of the data sequence and a real part signal 106 (αc) so as to send a real signal 108 (αac) to a subtracter 8. The arithmetic circuit in accordance with the present invention also comprises a multiplier 5 computing the product of an imaginary part signal 102 (b) of the data sequence and an inverted imaginary part signal 107$i$ (−αd) which is inverted by an inverter 3 so as to send a real signal 109 (−αbd) to a subtracter 8. The subtracter 8 subtracts the real signal 109 (−αbd) from the real signal 108 (αac) so as to obtain a real part 112 (αac + αbd) of an adaptation coefficient.

Referring to FIGS. 3A and 3B, differences between the conventional arithmetic circuit and the arithmetic circuit in accordance with the present invention can be clearly understood.

Figure 3C:
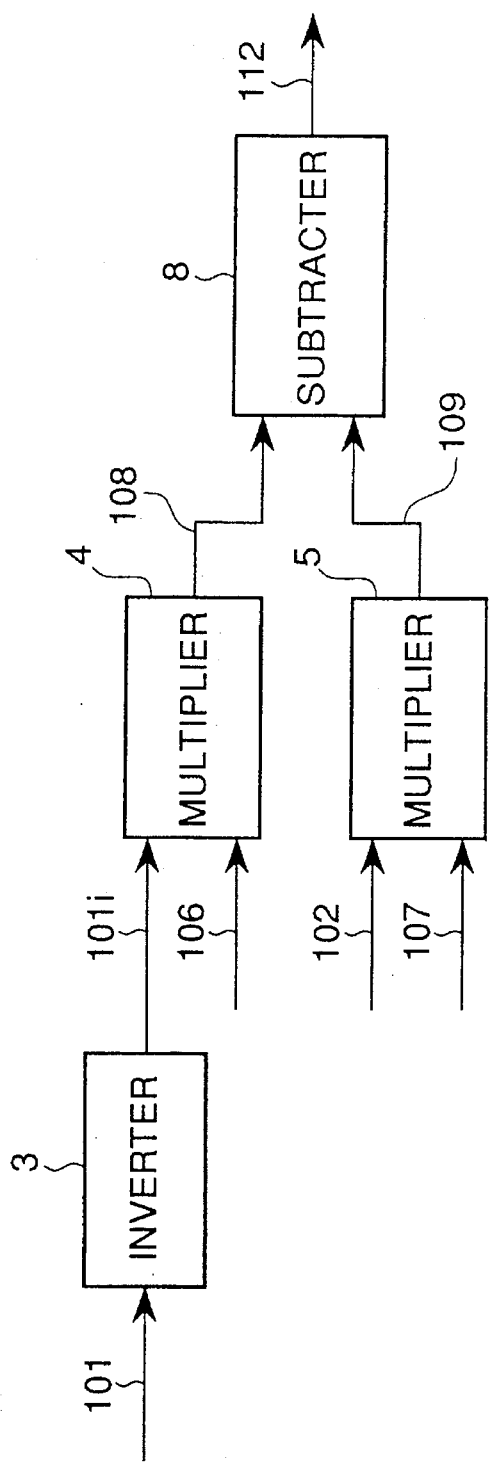
FIGS. 3C to 3E are partial block diagrams of variations of the arithmetic circuit in accordance with the present invention.
Figure 3D:
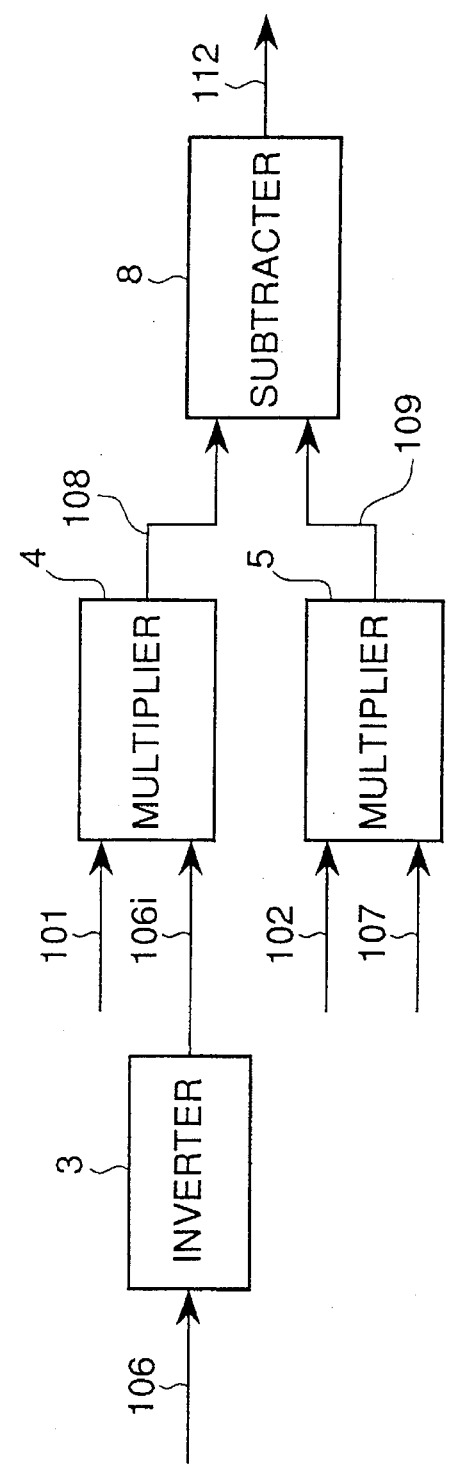
Figure 3E:
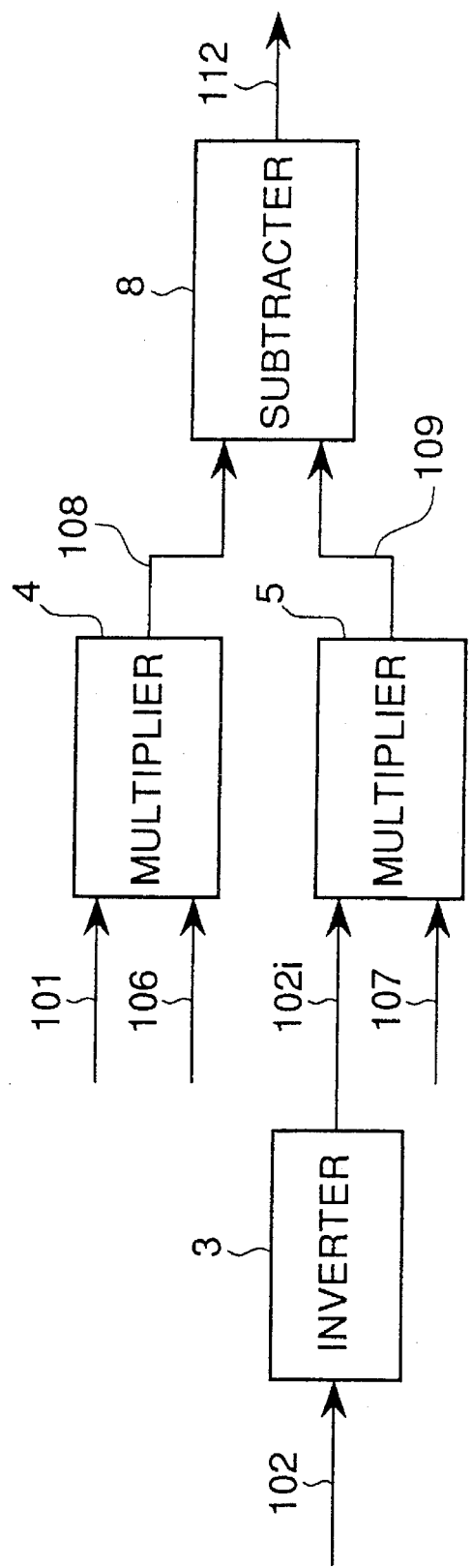

FIGS. 3C to 3E show partial block diagrams of variations of the arithmetic circuit in accordance with the present invention corresponding to FIG. 3B. The variation shown in FIG. 3C comprises an inverter 3 which inverts a real part the signal 101 (a) of the data sequence so as to send an inverted real part signal 101$i$ (−a) to a multiplier 4. In this case, the inverted real part signal 101$i$ (−a) is sent only to the multiplier 4 of a real operation part of the arithmetic circuit. The multiplier 7 of an imaginary operation part (shown in FIG. 2) receives the real part signal 101 (a) of the data sequence. The multiplier 4 computes the product of the inverted real part signal 101$i$ (−a) and a real part signal 106 (αc) so as to send a real signal 108 (−αac) to a subtracter 8. The arithmetic circuit also comprises a multiplier 5 computing the product of an imaginary part signal 102 (b) of the data sequence and an imaginary part signal 107 (αd) so as to send a real signal 109 (αbd) to the subtracter 8. The subtracter 8 subtracts the real signal 108 (−αac) from the real signal 109 (αbd) so as to obtain a real part 112 (αac + αbd) of an adaptation coefficient.

The variation shown in FIG. 3D comprises an inverter 3 which inverts a real part signal 106 (αc) so as to send an inverted real part signal 106$i$ (−αc) to a multiplier 4. In this case, the inverted real part signal 106$i$ (−αc) is sent only to the multiplier 4 of a real operation part of the arithmetic circuit. The multiplier 6 of an imaginary operation part (shown in FIG. 2) receives the real part signal 106 (αc). The multiplier 4 computes the product of the inverted real signal 106$i$ (−αc) and a real part signal 101 (a) of the data sequence so as to send a real signal 108 (−αac) to a subtracter 8. The arithmetic circuit also comprises a multiplier 5 computing the product of an imaginary part signal 102 (b) of the data sequence and an imaginary part signal 107 (αd) so as to send a real signal 109 (αbd) to the subtracter 8. The subtracter 8 subtracts the real signal 108 (−αac) from the real signal 109 (αbd) so as to obtain a real part 112 (αac + αbd) of an adaptation coefficient.

The variation shown in FIG. 3E comprises an inverter 3 which inverts an imaginary part signal 102 (b) of the data sequence so as to send an inverted imaginary part signal 102$i$ (−b) to a multiplier 5. In this case, the inverted imaginary part signal 102$i$ (−b) is sent only to the multiplier 5 of a real operation part of the arithmetic circuit. The multiplier 6 of an imaginary operation part (shown in FIG. 2) receives the imaginary part signal 102 (b) of the data sequence. The multiplier 5 computes the product of the inverted imaginary part signal 102$i$ (−b) and an imaginary part signal 107 (αd) so as to send a real signal 109 (−αbd) to a subtracter 8. The arithmetic circuit also comprises a multiplier 4 computing the product of a real part signal 101 (a) of the data sequence and a real part signal 106 (αc) so as to send a real signal 108 (αac) to the subtracter 8. The subtracter 8 subtracts the real signal 109 (−αbd) from the real signal 108 (αac) so as to obtain a real part 112 (αac + αbd) of an adaptation coefficient.

In the above embodiments of the arithmetic circuits in accordance with the present invention rounding processors are excluded so as to reduce amount of operations to two thirds of that of a conventional circuit and yet retain arithmetic accuracy.

The invention has thus been shown and described with reference to the specific embodiments. However, it should be noted that the present invention is in no way limited to the details of the illustrated structures but changes and modifications may be made within the scope of the appended claims.

I claim:

1. An arithmetic circuit for adaptive equalizer of Least Mean Square (LMS) algorithm comprising:

real operation means for computing a first product between a real part signal of a data sequence and a product of a real part signal of an error sequence and a step coefficient, and for computing a second product between an imaginary part signal of said data sequence and a product of an imaginary part signal of said error sequence and a step coefficient, wherein when either of said first and second products is negative, said real operation means obtains a real part of an adaptation coefficient from said first and second products; and imaginary operation means for computing a third product between said imaginary part signal of said data sequence and a product of said real part signal of said error sequence and said step coefficient, and for computing a fourth product between said real part signal of said data sequence and a product of said imaginary part signal of said error sequence and said step coefficient, wherein said imaginary operation means obtains an imaginary part of an adaptation coefficient from said third and fourth products.

2. An arithmetic circuit as claimed in claim 1, wherein said real operation means comprises:

a first multiplier for computing a first product between said real part signal of said data sequence and a product of said real part signal of said error sequence and a positive step coefficient, a second multiplier for computing a second product between said imaginary part signal of said data sequence and a product of said imaginary part signal of said error sequence and a negative step coefficient, and a first subtracter for subtracting said second product from said first product so as to obtain said real part of said adaptation coefficient; and wherein said imaginary operation means comprises:

a third multiplier for computing a third product between said imaginary part signal of said data sequence and a product of said real part signal of said error sequence and said positive step coefficient, a fourth multiplier for computing a fourth product between said real part signal of said data sequence and a product of said imaginary part signal of said error sequence and said positive step coefficient, and a second subtracter for subtracting said fourth product from third product so as to obtain said imaginary part of said adaptation coefficient from said third and fourth products.

3. An arithmetic circuit as claimed in claim 1, wherein said real operation means comprises:

a first multiplier for computing a first product between an inverted real part signal of said data sequence and a product of said real part signal of said error sequence and a positive step coefficient, a second multiplier for computing a second product between said imaginary part signal of said data sequence and a product of said imaginary part signal of said error sequence and said positive step coefficient, and a first subtracter for subtracting said first product from said second product so as to obtain said real part of said adaptation coefficient; and wherein said imaginary operation means comprises:

a third multiplier for computing a third product between said imaginary part signal of said data sequence and a product of said real part signal of said error sequence and said positive step coefficient, a fourth multiplier for computing a fourth product between said real part signal of said data sequence and a product of said imaginary part signal of said error sequence and said positive step coefficient, and a second subtracter for subtracting said fourth product from third product so as to obtain said imaginary part of said adaptation coefficient from said third and fourth products.

4. An arithmetic circuit as claimed in claim 1, wherein said real operation means comprises:

a first multiplier for computing a first product between said real part signal of said data sequence and a product of said real part signal of said error sequence and a negative step coefficient, a second multiplier for computing a second product between said imaginary part signal of said data sequence and a product of said imaginary part signal of said error sequence and said positive step coefficient, and a first subtracter for subtracting said first product from said second product so as to obtain said real part of said adaptation coefficient; and wherein said imaginary operation means comprises:

a third multiplier for computing a third product between said imaginary part signal of said data sequence and a product of said real part signal of said error sequence and said positive step coefficient, a fourth multiplier for computing a fourth product between said real part signal of said data sequence and a product of said imaginary part signal of said error sequence and said positive step coefficient, and a second subtracter or subtracting said fourth product from an output of said third product so as to obtain said imaginary part of said adaptation coefficient from said third and fourth products.

5. An arithmetic circuit as claimed in claim 1, wherein said real operation means comprises:

a first multiplier for computing a first product between said real part signal of said data sequence and product of said real part signal of said error sequence and a positive step coefficient, a second multiplier for computing a second product between an inverted imaginary part signal of said data sequence and a product of said imaginary part signal of said error sequence and said positive step coefficient, and a first subtracter for subtracting said second product from said first product so as to obtain said real part of said adaptation coefficient; and wherein said imaginary operation means comprises a third multiplier for computing a third product between said imaginary part signal of said data sequence and a product of said real part signal of said error sequence and said positive step coefficient, a fourth multiplier for computing a fourth product between said real part signal of said data sequence and a product of said imaginary part signal of said error sequence and said positive step coefficient, and a second subtracter for subtracting said fourth product from third product so as to obtain said imaginary part of said adaptation coefficient from said third and fourth products.

6. An arithmetic circuit, comprising:

real operation means for computing a first product between a real part signal of a data sequence and a product of a real part signal of an error sequence and a step coefficient, and for computing a second product between an imaginary part signal of said data sequence and a product of an imaginary part signal of said error sequence and a step coefficient, wherein either of said first and second products is negative, said real operation means for obtaining a real part of an adaptation coefficient from said first and second products; and imaginary operation means for computing a third product between said imaginary part signal of said data sequence and a product of said real part signal of said error sequence and said step coefficient, and for computing a fourth product between said real part signal of said data sequence and a product of said imaginary part signal of said error sequence and said step coefficient, said imaginary operation means for obtaining an imaginary part of an adaptation coefficient from said third and fourth products.

* * * * *